PAPERMAKING MACHINE HEADBOX HAVING TRAILING ELEMENTS IN THE SLICE CHAMBER EXTENDING IN THE STOCK FLOW DIRECTION

Original Filed Jan. 17, 1968 3 Sheets-Sheet 1

United States Patent Office

Re. 28,269
Reissued Dec. 10, 1974

28,269

PAPERMAKING MACHINE HEADBOX HAVING TRAILING ELEMENTS IN THE SLICE CHAMBER EXTENDING IN THE STOCK FLOW DIRECTION

Lester M. Hill, Beloit, Wis. and Joseph D. Parker, deceased, late of Roscoe, Ill., by Dorothy C. Parker, executrix, Roscoe, Ill., and Richard E. Hergert, Roscoe, Ill., assignors to Beloit Corp., Beloit, Wis.

Original No. 3,607,625, dated Sept. 21, 1971, Ser. No. 698,633, Jan. 17, 1968. Application for reissue Apr. 30, 1973, Ser. No. 355,544

Int. Cl. D21f *1/02*

U.S. Cl. 162—343 13 Claims

Matter enclosed in heavy brackets [ ] appears in the original patent but forms no part of this reissue specification; matter printed in italics indicates the additions made by reissue.

ABSTRACT OF THE DISCLOSURE

[A headbox construction for a papermaking machine which comprises a slice chamber connected to a preslice flow chamber by means of a perforate member. The slice chamber contains a plurality of plates and/or filaments attached to said perforate member and extend in the direction of stock flow through said slice chamber and define therein a multiplicity of relatively narrow channels of decreasing cross-sectional area in the direction of flow.]

*The slice chamber of a headbox contains a perforated plated to which are attached multiple trailing elements which extend in the stock stream direction. The trailing elements may be in the form of flexible plates that extend from pondside to pondside of the slice chamber with the downstream ends unattached and solely responsive to forces exerted thereon by the flowing stock. The trailing elements may be flexible rods which are connected to the downstream ends of rigid plates or tubes which themselves project in the stock stream flow direction and are atached to the perforated plate.*

This invention relates generally to a headbox for a papermaking machine, and more particularly to a headbox construction in which the slice chamber includes a plurality of passages formed by elements in the direction of stock flow to uniformly direct stock towards the slice opening at the downstream of said slice chamber.

In the Fourdrinier papermaking process, the principal difficulty in achieving uniform formation of a paper web is the natural tendency of the fibers to flocculate. An important feature of all Fourdrinier machine designs therefore is a means to disperse the fiber networks during the period of sheet formation. At the present time, dispersion of the fiber network is effected by generating turbulence, used in the broad sense, in the fiber suspension both in the headbox, frequently through the use of rectifier rolls, and on the Fourdrinier table as a consequence of the reaction of the free surface of the stock to the variable acceleration over table rolls and foils. The dispersing activity that occurs on the Fourdrinier table is an important supplement to the turbulence generated in the headbox and as a rule, the drainage on a Fourdrinier table is deliberately retarded to allow sufficient treatment of the undrained suspension to obtain uniform formation. On a Fourdrinier in which the table rolls have been replaced by suction boxes, on the other hand, the fiber suspension is drained comparatively much more rapidly with considerably less activity generated in the undrained suspension. It follows that the formation of the sheet formed on a suction box or flat box Fourdrinier is much more sensitive to the characteristics of the headbox discharge that that of a conventionally formed sheet.

A basic limitation in headbox design has been that the means for generating turbulence in fiber suspensions in order to disperse them have been comparatively large-scale devices only. With such devices, it is possible to develop small scale turbulence by increasing the intensity of turbulence generated. Thus the turbulence energy is transferred naturally from large to small scales and the higher the intensity, the greater the rate of energy transfer and hence, the smaller the scales of turbulence sustained. However, a detrimental effect also ensued from this high-intensity large-scale turbulence namely the large waves and free surface disturbance developed on the Fourdrinier table. Thus a general rule of headbox performance has been that the degree of dispersion and level of turbulence in the headbox discharge were closely correlated; the higher the turbulence, the better the dispersion.

In selecting a headbox design under this limiting condition then, one could choose at the extreme, either a design that produces a highly turbulent, well-dispersed discharge, or one that produces a low-turbulent, poorly dispersed discharge. Since either a very high level of turbulence or a very low level (and consequent poor dispersion) produces defects in sheet formation on the Fourdrinier machine, the art of headbox design has consisted of making a suitable compromise between these two extremes. That is, a primary objective of headbox design up to this time has been to generate a level of turbulence which was high enough for dispersion, but low enough to avoid free surface defects during the formation period. It will be appreciated that the best compromise would be different for different types of papermaking furnishes, consistencies. Fourdriner table design, machine speed, etc. Thus a universal headbox design with presently available devices and techniques would be difficult, if not impossible to establish. Furthermore, because these compromises always sacrifice the best possible dispersion and/or the best possible flow pattern on the Fourdrinier wire, it is deemed that there is a great potential for improvement in headbox design today.

The defects in sheet formation as a result of these extremes in headbox design, i.e., very high or very low turbulence, are even more marked when a Fourdrinier is used wherein all table rolls and foils are replaced by suction boxes. Thus when the turbulence is very low, as for example in the discharge from a conventional rectifier roll-type headbox, the formation of the sheet formed by the rapid drainage over suction boxes in the absence of the table roll activity directly reflects the poor dispersion in the discharge jet. On the other hand, when the turbulence is very high, a wave pattern is generated in the free surface of the flow on the wire as a consequence of the turbulence. With rapid drainage of the suspension in this case, the formation of the sheet reflects the mass distribution pattern of these waves. In addition to the free surface wave patterns, excessive turbulence may also entrain air and disrupt the thickened fiber mat which had been deposited earlier and cause formation defects.

Thus not only are the present extremes of headbox characteristics unsuitable, but it is also difficult to find a suitable compromise for a suction box Fourdrinier application.

The unique and novel combination of elements of the present invention provide for delivery of the stock slurry to a forming surface of a papermaking machine having a high degree of fiber dispersion with a low level of turbulence in the discharge jet. Under these conditions, a fine scale dispersion of the fibers is produced which will not deteriorate as the turbulence decays away, at least it will not deteriorate to the extent that occurs in the turbulent dispersions which are produced by conventional headbox designs. It has been found that it is the absence of large-scale turbulence which precludes the gross reflocculation of the fibers since flocculation is predominately a consequence of small scale turbulence decay and the persistence of the large scales. Sustaining the dispersion in the flow on the Fourdrinier wire then, leads directly to improved formation.

The method by which the above is accomplished, that is, to produce fine scale turbulence without large scale eddies, is to pass the fiber suspension through a system of parallel channels of uniform small size but large in percentage open area. Both of these conditions, uniform small channel size and large exit percentage open area, are necessary. Thus the largest scales of turbulence developed in the channel flow have the same order of size as the depth of the individual channels and by maintaining the individual channel depth small, the resulting scale of turbulence will be small. It is necessary to have a large exit percentage open area to prevent the development of large scales of turbulence in the zone of discharge. That is, large solid areas between the channel's exits, would result in large-scale turbulence in the wake of these areas.

In concept then, the flow channel must change from a large entrance to a small exit size. This change should occur over a substantial distance to allow time for the large-scale coarse flow disturbances generated in the wake of the entrance structure to be degraded to the small-scale turbulence desired. The walls defining the channels immediately following the entrance structure should be stiff enough to resist distortion and fluctuation by these coarse flow disturbances and consequent dynamic pressure variations. For this reason, it is important for the entrance to have a reasonably large open area to avoid unreasonably large downstream pressure fluctuations. Thus the more the coarse turbulence in the flow channel is degraded toward a fine scale, the less stiff the channel walls need be to resist distortion. A simple way of achieving stiffness is by increasing the thickness of the channel wall and this is the type of construction used at present as will be hereinafter described in detail. Since it is therefore desirable for the channel walls to progress from stiff thick members at their upstream ends to thin members at their downstream ends, the structure for conditioning the flow should consists of gradually converging channels defined by walls which simultaneously slowly converge and gradually decreases in stiffness. Thus the simultaneous convergence of the channel size and the walls defining the channels are complementary effects. Because of the diminishing channel depth, the pressure fluctuations are reduced to smaller scale and hence lower intensities which allows thinner walls to be used to define the channel. Because of the diminishing wall thickness, the area between channels approaches the small dimension that it must have at the exit end. This concept of simultaneous convergence is deemed to be an important concept of design of this invention. While the downstream channel walls are thin they may also be, and preferably are, flexible for the following reasons:

1. the flexibility allows the training members to seek hydrodynamically stable positions, which is a uniform spacing; and 2. the flexibility where the channels are small in cross-sectional area allows large fiber chunks and foreign matter to pass freely.

It is therefore an important object of the present invention to provide for a stock-delivery system in the form of a headbox for delivering papermaking stock to the forming surface of the papermaking machine under conditions of maximum dispersion with a minimum of turbulence in the discharge jet.

Another object of the present invention is to provide a headbox for a papermaking machine which produces a fine-scale dispersion of the fibers which dispersion will not deteriorate excessively as the turbulence decays away.

Additional objects, advantages and features of the present invention are apparent from the preceding description and will become more apparent as this specification proceeds with reference to the accompanying drawings in which.

Figure 2:
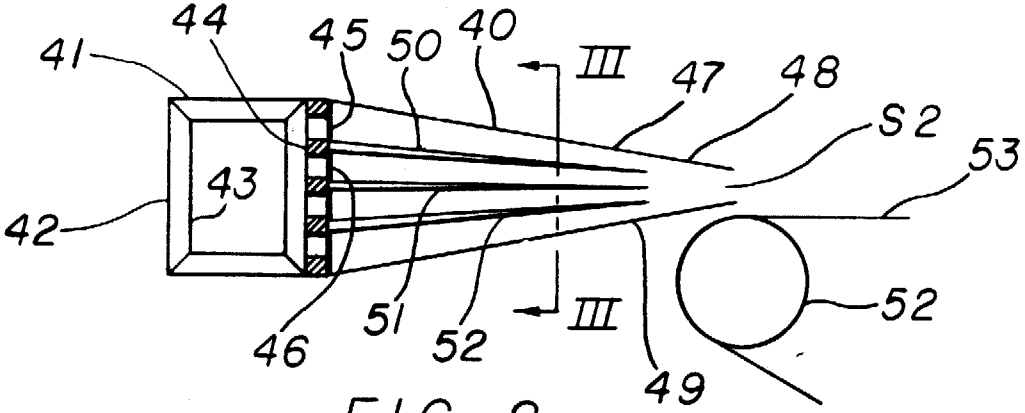
FIG. 2 is an elevational sectional view showing another embodiment of a headbox construction for use in the practice of the present invention.
Figure 4:
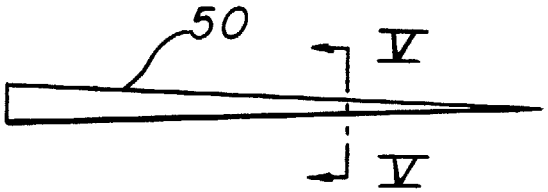
Figure 5:
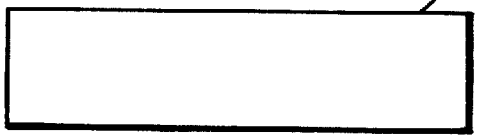

FIG. [4] *3* is a cross-sectional view taken along the lines III—III of FIG. 2 and showing a modification of the present invention;

[FIG. 5 is a cross-sectional view taken along the lines III—III of FIG. 2 and showing a further modification of the present invention;] *4*

Figure 1:
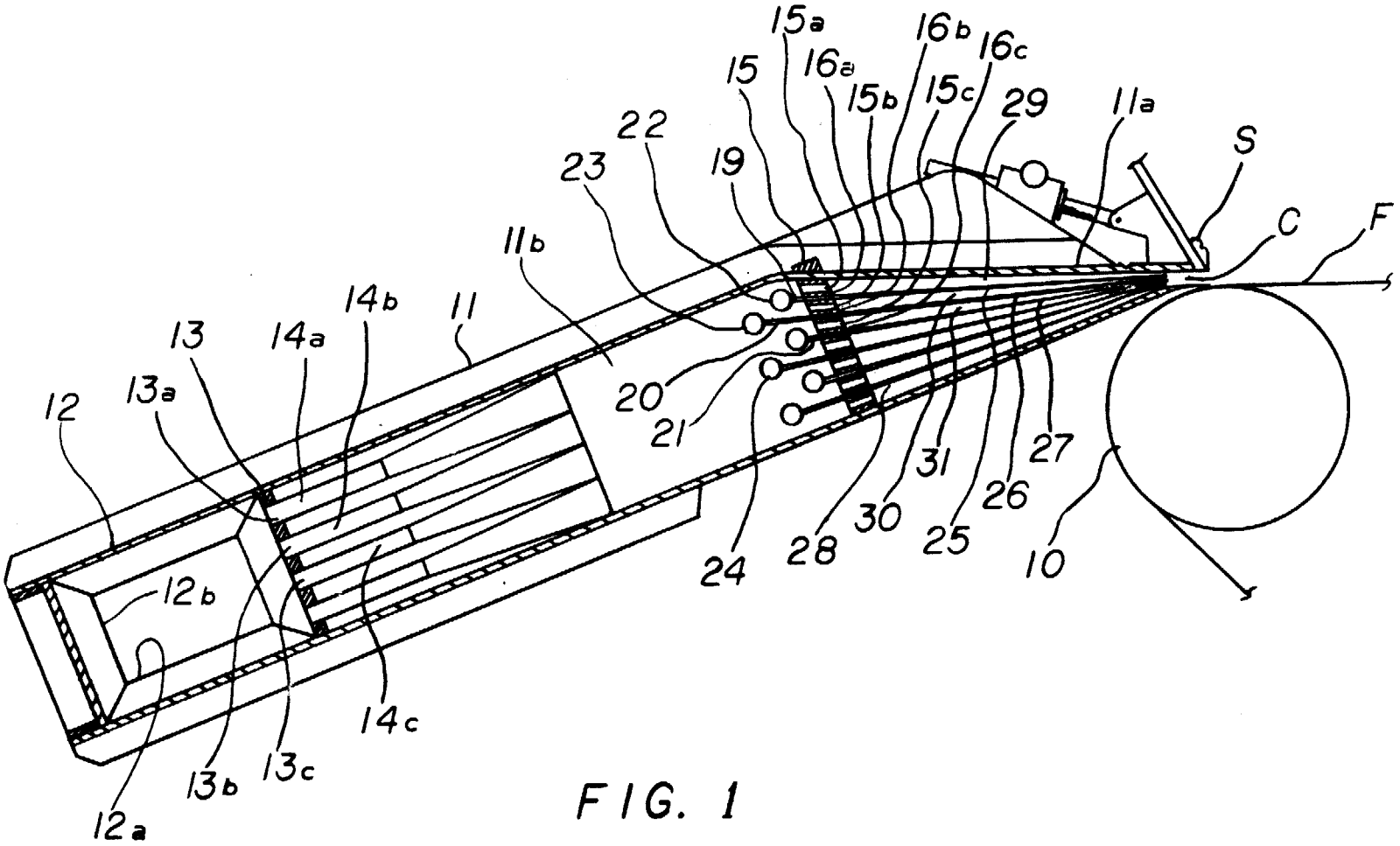
FIG. 1 is an elevational sectional view showing a headbox construction for use in the practice of the present invention.
Figure 6:
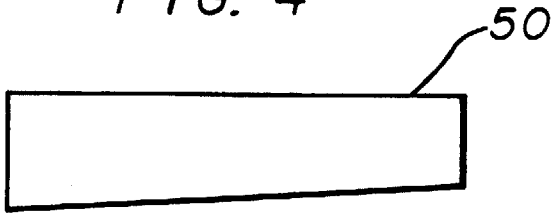
Figure 7:
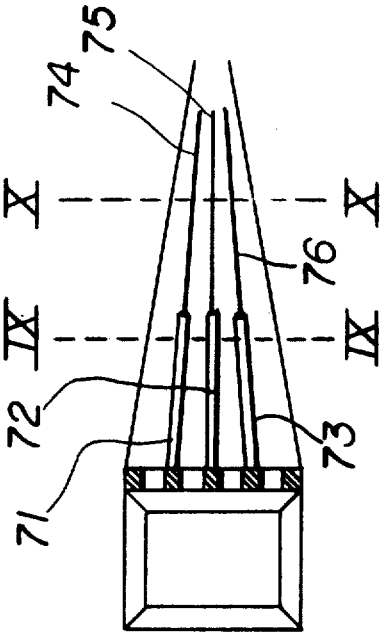
Figure 8:
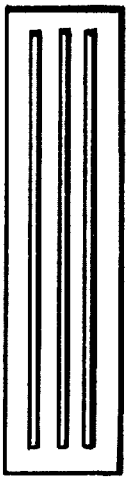

FIG. [6] *4* is an enlarged elevational view of an essential element of the embodiments shown in FIGS. 1 and 2;

[FIG. 7 is a cross-sectional view taken along the lines VII—VII of FIG. 6; FIGS. 8 and 8a is a cross-sectional view taken along the lines VII—VII of FIG. 6 and showing a different form of the element shown in FIG. 6];

FIG. [9] *5* is a plan view of the element shown in FIG. [6]; *4*

FIG. [10] *6* is a plan view showing the element of FIG. [6] *4* in somewhat different form;

FIG. [11] *7* is an elevational sectional view showing yet another embodiment of a headbox construction for use in the practice of the present invention;

FIG. [12] *8* is a cross-sectional view taken along the lines [XI—XI of F. 11] *IX—IX of FIG. 7;*

Figure 11:
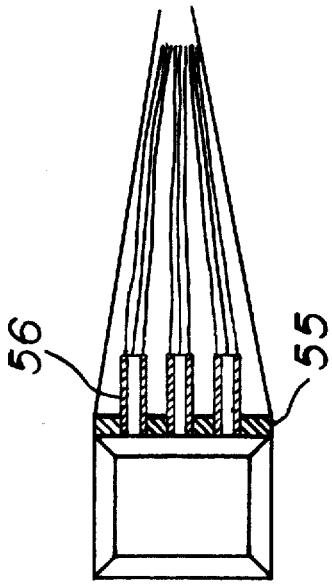
Figure 12:
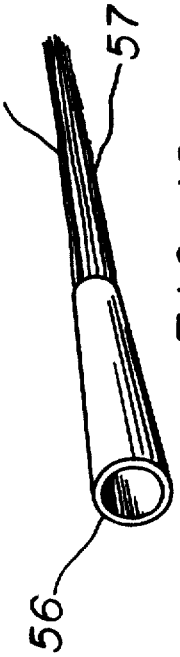

FIG. [13] *9* is a cross-sectional view taken along the lines [XII—XII of FIG. 11] *X—X of FIG. 7;*

FIG. [14] *10* is a perspective view of an essential element of the structure shown in FIG. [11] *7;*

FIG. [15] *11* is a cross-sectional elevational view of a different embodiment of the present invention; and FIG. [16] *12* is a perspective view of an essential element of the structure shown in FIG. [15] *11.*

As shown on the drawings:

As the terms are used herein, transverse refers to the cross-machine direction whereas longitudinal refers to the so-called machine direction.

In FIG. 1, it will be seen that there is shown a forming wire F traveling around a breast roll 10 to define a conventional forming surface onto which papermaking stock is fed through a slice opening indicated generally at S. The slice S is mounted at the forward end of a headbox indicated generally at 11, such headbox being what constitutes a slice chamber 11a and a preslice flow chamber 11b in that it aligns the stock for flow toward the slice S.

In a conventional stock inlet the stock is generally fed to the headbox, such as the one here employed, from a fan pump or other suitable source of stock in a relatively small high-speed conduit which is indicated in FIG. 1 by the reference numberal 12 as a tapered cross-machine header having an inlet 12a at the side of the headbox 11 from which it is viewed in FIG. 1 and an outlet 12b of diminished cross-sectional area at the backside of the chamber 12 for flow of stock in a generally transverse direction through the tapered inlet header 12. Any of a number of known stock-inlet devices may be provided to present a transverse flow of stock into the chamber 12 under a substantially uniform pressure in the general area of the barrier or perforated mounting plate indicated at 13. The perforated plate 13 extends transversely of the stock inlet 12 and it is provided with a plurality of apertures 13a, 13b, 13c, etc. which are generally parallel and which are spaced tranversely to define a multiplicity of generally parallel apertures extending across the entire plate 13. The plate 13 carries a multiplicity of diffuser nozzles 14a, 14b, 14c, etc. each of which is received in one of the multiplicities of apertures 13a, 13b, 13c, in the plate 13. At their downstream end the diffuser nozzles communicate with a preslice flow chamber 11b. The chamber 11b, in the direction of stock flow, is defined by the downstream end of the diffuser nozzles 14a, 14b, 14c, etc. and a perforated plate 15 extending transversely of the headbox 11.

The plate 15 contains a multiplicity of perforations 15a, 15b, 15c, etc. distributed between land areas 16a, 16b, 16c, etc.

The perforations 15a, 15b, 15c, etc. extend in generally horizontal rows thus leaving continuous land areas 16a, 16b, 16c, etc. between the rows.

Extending through the land areas are plates 19, 20, 21, etc. These plates extend tranversely of the slice chamber 11a and longitudinally towards the slice S. It will further be noted that the plates 19, 20, 21, etc. also longitudinally extend through the plate 15 in an upstream direction and have mounted thereto at their upstream ends transversely extending rods 22, 23, 24, etc. This unique and novel combination of perforations 15a, 15b, 15c, etc. land areas 16a, 16b, 16c, etc. plates 19, 20, 21, etc. extending upstream of the perforated plate 15 and rods 22, 23, 24, etc. permits a substantial increase in open area of the perforated plate 15 the desirability of which will be hereinafter described in detail.

With an increase in open area of the plate 15 the area of the lands between the perforations will be substantially reduced. These narrow land areas will tend to collect fibers which collection will gradually increase and may result in large chunks of fibers being released into the slice chamber 11a causing disruption of the papermaking process. In order to avoid the stapling of fibers to the land areas of plate 15 the plates 19, 20, 21, etc. are extended in an upstream direction with respect to the land areas. To prevent stapling of fibers to the upstream ends of the plates, rods are large enough in diameter to prevent stapling of fibers thereto. Of course, the rods may have various shapes such as flat, blunt or teardrop.

As shown in the drawings the slice chamber 11a gradually decreases in cross-sectional area in the direction of flow towards the slice opening S and its longitudinal boundaries are defined by the perforated plate 15 and the slice opening S. Plates or trailing members 25, 26, 27, etc. extend from the plate 15 to the slice opening S and divide the slice chamber into a multiplicity of approximately vertically spaced longitudinally extending channels 29, 30, 31, etc. The channels also extend transversely of the slice chamber 11a. The trailing members are anchored only at their upstream ends to the perforated plate 15 and are free floating downstream. It is therefore desirable that the trailing members are reasonably close to neutrally buoyant to allow positioning by the hydrodynamic effects of stock flow between the trailing members. It has also been found desirable for the trailing members to progress from stiff thick members at their upstream ends to thin relatively flexible members at their downstream ends. To accomplish this, as shown on the drawing, the trailing members defining the converging channels are simultaneously slowly decreasing in stiffness in the direction of stock flow.

In a practical embodiment of the present invention the spring C of the individual channels between trailing members preceding the slice opening S should be in the order one eighth inch or smaller and the size of the solid areas between the channels at their exits should be much smaller than the size of the channels themselves. The exit open area should therefore be preferably in the order of at least 80–95 percent. However, open areas in the order of 50 percent and larger are conceivable. In order to prevent plugging of the entrance portion of the slice chamber it is desirable to maintain the vertical dimension of each of the channels 29, 30 and 31, etc. at the upstream end in the order of 1 inch and the overall open area of the perforated plate 15 should preferably be greater than 30 percent. However, as a general rule the openings in the distributor should be as small as possible for maintaining the flow pattern small but large enough to avoid plugging. These criteria will vary with the particular application and stock characteristics.

It has further been found desirable to impart some flexibility to the downstream end of the trailing members 25, 26, 27, etc. This flexibility provides a convenient way to achieve the small uniform spacing of the members across the width of the slice chamber at the downstream end since this uniform spacing is a hydrodynamically stable condition for this particular structure as indicated by experiments. Thus, flexibility allows the trailing members to be positioned by the dynamic forces of flow; that is, to conform to the streamlines. Alternatively, it would be difficult to achieve uniformly spaced rigid trailing members without mounting the members to the sides of the slice chamber and even then it would be difficult.

It is also desirable to impart some flexibility to the trailing members to allow the passage of large particles which are inevitably present in a commercial stock-flow system. It is therefore a feature of the present invention not to have the trailing members attached to the sides of the slice chamber since this simplifies the construction and avoids a thin rigid channel which would be conductive to plugging by fibers and foreign matter.

In operation, papermaking stock is introduced into the tapered inlet 12 through entrance opening 12a. A portion of the stock enters orifices 13a, 13b, 13c, etc. while the remaining portion exits the tapered inlet 12 through opening 12b for recirculation. From the orifices 13a, 13b. 13c, etc. the stock enters the diffusers 14a, 14b, 14c, etc. by means of which the stock is uniformly distributed across the full width of the preslice chamber 11b. The distribution of stock across the width of the preslice chamber is of a coarse nature having a scale of turbulence or variations in the order of a few inches. The coarsely distributed stock is then forced through the perforations in plate 15 by means of which the scale of turbulence is somewhat reduced but remains far above the desired level for formation of a web. The stock then enters the channels 29, 30, 31, etc. under conditions of relatively coarse and intense turbulence. The upstream ends of the trailing members are supported by the plate 15 and they are strong enough to accommodate the relatively large scale and intensity of the turbulence in the stock. As the stock progresses through the channels, the cross section of which decreases gradually, the intensity and degree of turbulence is likewise decreased. At the downstream end and near the slice portion S the channels are narrow and bounded by flexible walls. At this end of the scale of turbulence has been diminished to acceptable papermaking standards. This diminishing turbulence is accomplished by reducing the channel size while still allowing coarse particles to pass by reason of the flexibility of the trailing members defining the channels. The turbulence of the stock, therefore, in the channels is continually degraded from a coarse intense condition to a fine-scale low level. The walls of the channels are graduated in thickness and stiffness accordingly. The ultimate scale of turbulence in the flow from the channels is governed by the size of the channels near the downstream end, and the intensity is determined by the velocity of flow through the channels which in turn is determined by the number of channels. In this manner the scale and intensity of the discharge flow can be independently controlled.

FIGS. 2 through 12 show additional details and other forms of the present invention.

As shown in FIG. 2 a headbox 40 of somewhat simplified design comprises a tapered inlet header 41 having an inlet opening 42 and an overflow opening 43. The front wall of the header 40 comprises a perforated plate 44 having a multiplicity of perforations 45, 46 etc. therein. These perforations are preferably in the form of orifices and provide for open communication between the inlet header and a slice chamber generally designated by the numeral 47. The slice chamber 47 comprises top 48 and bottom 49 wall converging in the longitudinal or machine direction and terminating at a slice portion S2. Appropriate transversely spaced sidewalls *or pondsides* are provided at the front and rear end of the slice chamber. Extending longitudinally within the slice chamber 47 are a plurality of trailing elements 50, 51, 52, etc. One end of each of these trailing elements is attached to the perforated plate 44 at the upstream end of the slice chamber 47. The trailing elements extend for approximately the full length of the slice chamber and are not attached to any other part of the chamber other than at the perforated plate 44.

The trailing elements are thus permitted to float freely within the slice chamber with the exception of their restriction at the point of attachment to the perforated plate 44. With papermaking stock flowing through the slice chamber the trailing elements will form a multiplicity of longitudinally extending flexible channels through which the papermaking stock will flow thereby gradually reducing large-scale turbulence in the papermaking stock while maintaining a high degree of fiber dispersion. The thus-conditioned papermaking stock exits through the slice opening S2 and is deposited on the Fourdrinier wire 53 or on any other appropriate web-forming surface. The Fourdrinier wire 53 is supported immediately beneath the slice by a roll 54, commonly referred to as a breast roll.

Figure 3:
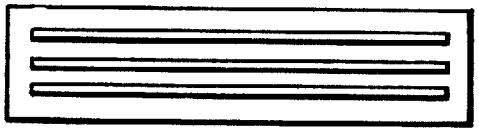
[FIG. 3 is a cross-sectional view taken along the lines III—III of FIG. 2;]

As shown in FIGS. 3 through [10] *6* the trailing members may have different forms each of which can be readily adapted to suit a particular operating condition. *For example, the flexible members 50, 51, and 52, etc. may extend.* [For example, as will be readily apparent to those skilled in the art it may be more convenient to have the flexible members 50, 51, and 52, etc. extend] transversely of the slice chamber in the form of a full-width sheet, as described in connection with FIG. 1 [, where the transverse dimension of the preslice flow chamber is relatively narrow. On the other hand, it will be apparent that in extremely wide headboxes it may be more practical to have a plurality of relatively narrow sheets extending in the transverse direction of the slice chamber]. Accordingly, FIG. [4] *3* shows the flexible trailing elements extending transversely of the slice chamber with the flexible elements having approximately the same transverse dimension as the slice chamber.

[As shown in FIG. 5 the transverse dimension of the individual trailing elements 60, 61, 62, etc. is reduced to a fraction of the transverse dimension of the preslice flow chamber which may be a more practical approach for headboxes having a relatively large transverse dimension.

FIG. 3 shows as further embodiment of the present invention and it will be noted that the trailing elements herein consist of a plurality of flexible rods or wires 63, 64, 65, etc. having a generally circular cross-sectional area. This embodiment is particularly useful where stock characteristics require the use of channels of extremely small cross-sectional area.]

As shown in FIG. [6,] *4*, the longitudinal cross-sectional area of the trailing elements 50, 51, 52 etc. is preferably made so as to have its cross-sectional area decrease longitudinally in the direction of flow. The decrease in cross-sectional area is commensurate with the decrease in cross-sectional area of the slice chamber 11a of FIG. 1 and 47 of FIG. 2. In this manner the complementary effects of simultaneous convergence of the channel size and the flexible elements are obtained. In the embodiment of FIG. [6] *4* the transverse cross-sectional area remains substantially rectangular [as shown in FIG. 7].

Figure 10:
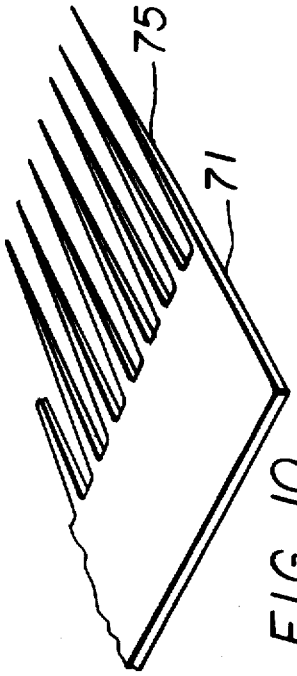
Figure 9:
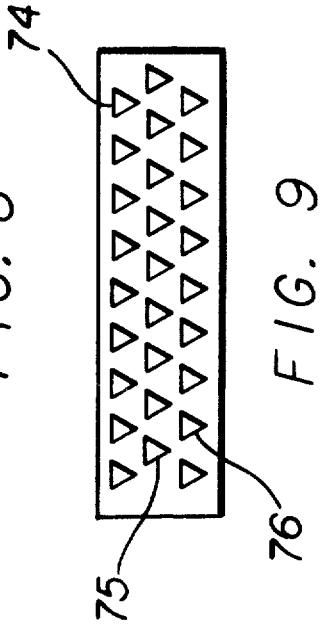

[FIG. 8 shows the cross-sectional area of the trailing elements 50, 51, 52, etc. of FIG. 3 and while this cross-sectional area is generally indicated as circular, it will be appreciated that such cross-sectional area may take several forms such as hexagonal elliptical or triangular, depending on the methods by which the flexible material is manufactured. The trailing elements of FIGS. 3 and 8 may also decrease in the longitudinal flow direction such as shown in FIG. 6. FIGS. 9 and 10] *FIGS. 5 and 6* are plan views of the flexible elements 50, 51, 52, etc. and it will be noted that the element 50 may be of uniform width such as shown in FIG. [9] 5 or alternatively may gradually decrease in width in the longitudinal direction such as shown FIG. [10] *6*.

FIG. [11] *7* shows a further embodiment of the present invention and it will be noted that the trailing elements 71, 72, 73, etc. have been given a somewhat modified form in that the upstream ends of the trailing elements are in the form of relatively stiff plates to the ends of which are attached flexible trailing elements 74, 75, 76, etc. FIG. [12] *8* shows the plates 71, 72, 73, etc. in cross section and it will be noted that they extend for approximately the full width of the slice chamber. FIG. [13] *9* shows the trailing elements 74, 75, 76, etc. in cross section and indicates their approximate position with respect to the slice chamber it being understood that the actual number of such trailing elements in a commercial design would be substantially larger depending of course on the particular characteristics of the papermaking stock. FIG. [14] *10* shows a perspective view of the combination of the plates 71 and flexible elements 75. The relatively stiff plates 71 may be manufactured of plastic or sheet metal and their cross-sectional area may be substantially constant or gradually decreasing in the direction of flow. The flexible trailing elements 74 are preferably made in the form of tapering flexible rods but may also be in the form of constant diameter monofilament threads.

FIG. [15] *11* shows a further embodiment of the present invention and it will be noted that the perforated plate 55 is somewhat modified in form in that the perforations are extended in the direction of flow by means of a short length of pipe 56 protruding through and extending beyond the perforated plate 55. As shown in detail in FIG. [16] *12* each of the pipes 56 has attached thereto at its downstream end a plurality of flexible trailing elements 57. The elements 57 are in the form of flexible threads one end of which is attached in a suitable manner to the downstream end of the pipe 56.

Thus it will be seen that an improved headbox has been provided which achieves the objectives and advantages set forth and overcomes the disadvantages associated with prior art systems thereby obtaining a result heretofore unobtainable.

While it is theoretically desirable to construct the aforementioned trailing members so that they are both flexible and converging it should be understood that a practical and workable solution may use relatively rigid and non-tapering trailing members or alternatively flexible non-tapering members. The material used for such members may be metal or nonmetal such as plastics, rubber, epoxy resins etc.

The drawings and specifications present a detailed disclosure of the preferred embodiments mentioned and it is to be understood that the invention is not limited to the specific form disclosure, but covers all modifications, changes and alternative constructions and methods falling within the scope and principles taught by the invention.

We claim as our invention:

1. In a headbox for delivering stock to a forming surface, the headbox having a slice chamber and a slice opening, the improvement comprising a plurality of trailing elements positioned in the slice chamber, each of said elements extending transversely of said headbox *from pondside to pondside,* means anchoring said elements only at their upstream ends at locations spaced generally perpendicular to the stock-flow stream with their downstream portions unattached and constructed to be self-positionable so as to be solely responsive to forces exerted thereon by the stock flowing towards the slice.

2. The structure of claim 1 wherein the transverse cross-sectional area of said elements decreases in the direction of stock flow.

3. The structure of claim 2 wherein the transverse cross-sectional area of said slice chamber decreases in the direction of stock flow.

[4. In a headbox for delivering stock to a forming surface, the headbox having a slice chamber and a slice opening, the improvement comprising a plurality of rigid plates positioned in the slice chamber, each of said plates extending transversely of said headbox and projecting downstream generally in the direction of stock flow, and trailing elements attached to the downstream ends of said plates, said elements being attached to said plates only at their upstream ends with their downstream portions unattached and constructed to be self-positionable so as to be solely responsive to forces exerted thereon by the stock flowing towards the slice.]

[5. The structure of claim 4 wherein said elements are in the form of sheets extending transversely of said headbox.]

[6. The structure of claim 4 wherein said elements are in the form of flexible rods.]

[7. The structure of claim 7 wherein the transverse cross-sectional area of said rods is triangular.]

[8. The structure of claim 6 wherein the transverse cross-sectional area of said rods decreases in the direction of flow.]

[9. The structure of claim 4 wherein the transverse cross-sectional area of said elements decreases in the direction of flow.]

[10. In a headbox for delivering stock to a forming surface, the headbox having a slice chamber and a slice opening, the improvement comprising a plurality of rigid members positioned in the slice chamber, each of said members projecting downstream generally in the direction of stock flow, means supporting said members only at their upstream ends at locations spaced generally perpendicular to the stock flow stream, and trailing elements attached to the downstream ends of said members, said elements being attached to said members only at their upstream ends with their downstream portions unattached and constructed to be self-positionable so as to be solely responsive to forces exerted thereon by the stock flowing towards the slice.]

[11. The structure of claim 10 wherein said means comprise tubes.]

12. In a headbox for delivering stock to a forming surface, the headbox having a slice chamber and a slice opening, the improvement comprising a trailing element positioned in the slice chamber, said element extending transversely of said headbox *from pondside to pondside*, means anchoring said element only at its upstream end with its downstream portion unattached and constructed to be self-positionable so as to be solely responsive to forces exerted thereon by the stock flowing towards the slice.

[13. In a headbox for delivering stock to a forming surface, the headbox having a slice chamber and a slice opening, the improvement comprising a rigid plate positioned in the slice chamber, said plate extending transversely of said headbox and projecting generally in the direction of stock flow, and a trailing element attached to the downstream end of said plate, said element being attached to said plate only at its upstream end with its downstream portion unattached and constructed to be self-positionable so as to be solely responsive to forces exerted thereon by the stock flowing towards the slice.]

14. In a head box for delivering stock to a forming surface, the headbox having a slice chamber and a slice opening, the improvement comprising a rigid member positioned in the slice chamber, said member projecting downstream generally in the direction of stock flow, means supporting said member only at its upstream end and trailing elements attached to the downstream end of said member, said elements being attached to said member only at their upstream ends with their downstream portions unattached and constructed to be self-positionable so as to be solely responsive to forces exerted thereon by the stock flowing towards the slice.

*15. In a headbox for delivering stock to a forming surface, the headbox having a slice chamber and a slice opening, the improvement comprising:*

*perforate walls means mounted in said slice chamber transversely of said slice chamber and located in an upstream portion of said slice chamber,*

*a plurality of rigid plates,*

*means for attaching the upstream ends of said plates to said wall means,*

*said plates extending transversely of said headbox from pondside to pondside and projecting downstream generally in the direction of stock flow,*

*and trailing elements attached to the downstream ends of said plates,*

*said elements being attached to said plates only at their upstream ends with their downstream portions unattached and constructed to be self-positionable so as to be solely responsive to forces exerted thereon by the stock flowing towards the slice.*

*16. The structure of claim 15 wherein said elements are in the form of sheets extending transversely of said headbox.*

*17. The structure of claim 15 wherein said elements are in the form of flexible rods.*

*18. The structure of claim 17 wherein the transverse cross-sectional area of said rods is triangular.*

*19. The structure of claim 17 wherein the transverse cross-sectional area of said rods decreases in the direction of flow.*

*20. The structure of claim 15 wherein the transverse cross-sectional area of said elements decreases in the direaction of flow.*

*21. In a headbox for delivering stock to a forming surface, the headbox having a slice chamber and a slice opening, the improvement comprising:*

*perforate wall means mounted in said chamber and located in an upstream portion of said slice chamber,*

*a plurality of tubes positioned in said slice chamber and in open communication with said perforate wall means,*

*each of said tubes projecting downstream generally in the direction of stock flow,*

*means supporting said tubes only at their upstream ends at locations spaced generally perpendicular to the stock flow stream,*

*and trailing elements attached to the downstream ends of said tubes,*

*said elements being attached to said tubes only at their upstream ends with their downstream portions unattached and constructed to be self-positionable so as to be solely responsive to forces exerted thereon by the stock flowing towards the slice.*

*22. In a headbox for delivering stock to a forming surface, the headbox having a slice chamber and a slice opening, the improvement comprising:*

*perforate wall means mounted in said slice chamber and located in an upstream portion of said slice chamber,*

*a rigid plate,*

*means for attaching the upstream end of said plate to said wall means,*

*said plate extending transversely of said headbox from pondside to pondside and projecting downstream generally in the direction of stock flow,*

*and a trailing element attached to the downstream end of said plate,*

*said element being attached to said plate only at its upstream end with its downstream portion unattached and constructed to be self-positionable so*

*as to be solely responsive to forces exerted thereon by the stock flowing towards the slice.*

References Cited

The following references, cited by the Examiner, are of record in the patented file of this patent or the original patent.

UNITED STATES PATENTS

| | | | |
|---|---|---|---|
| 2,394,509 | 2/1946 | Boettingr | 162—343 |
| 3,135,650 | 6/1964 | Robinson et al. | 162—343 X |
| 3,272,233 | 9/1966 | Trufitt | 162—336 X |
| 2,832,268 | 4/1958 | Boone et al. | 162—343 |

FOREIGN PATENTS

| | | | |
|---|---|---|---|
| 236,864 | 7/1925 | Great Britain | 162—343 |
| 1,026,276 | 4/1966 | Great Britain | 162—343 |

OTHER REFERENCES

Sushereba, "Broad Selection of Headboxes—Considerations for Fine Papers," in Paper Trade Journal, Aug. 3, 1964 (pp. 22–25).

S. LEON BASHORE, Primary Examiner

R. H. TUSHIN, Assistant Examiner

U.S. Cl. X.R.

162—336, 344